(12) United States Patent
Yoon et al.

(10) Patent No.: US 10,604,172 B2
(45) Date of Patent: Mar. 31, 2020

(54) MOTOR-DRIVEN STEERING COLUMN DEVICE FOR VEHICLE

(71) Applicants: Hyundai Motor Company, Seoul (KR); Kia Motors Corporation, Seoul (KR)

(72) Inventors: Sang Gyu Yoon, Incheon (KR); Jin Ho Bae, Suwon-si (KR); Yong Sun Kim, Seoul (KR); Beom Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 15/802,822

(22) Filed: Nov. 3, 2017

(65) Prior Publication Data
US 2018/0281840 A1    Oct. 4, 2018

(30) Foreign Application Priority Data

Apr. 3, 2017    (KR) .................. 10-2017-0042828

(51) Int. Cl.
*B62D 1/19*      (2006.01)
*B62D 5/04*      (2006.01)
*B62D 1/187*     (2006.01)
*B62D 1/181*     (2006.01)

(52) U.S. Cl.
CPC ............. *B62D 1/192* (2013.01); *B62D 1/181* (2013.01); *B62D 1/187* (2013.01); *B62D 5/0409* (2013.01)

(58) Field of Classification Search
CPC .......... B62D 1/181; B62D 1/18; B62D 1/185; B62D 1/187; B62D 1/192; B62D 1/197; B62D 5/0409
USPC ........................................... 74/493
See application file for complete search history.

(56) References Cited

U.S. PATENT DOCUMENTS

| | | | | |
|---|---|---|---|---|
| 4,962,944 A * | 10/1990 | Reiche | ........... | B62D 1/185 280/775 |
| 5,845,936 A * | 12/1998 | Higashino | ........... | B62D 1/192 280/775 |
| 2006/0191368 A1* | 8/2006 | Sawada | ........... | B62D 1/181 74/495 |
| 2007/0127982 A1* | 6/2007 | Bohlen | ........... | B62D 1/187 403/119 |
| 2007/0151392 A1* | 7/2007 | Oshita | ........... | B62D 1/192 74/493 |

(Continued)

FOREIGN PATENT DOCUMENTS

JP    2012-121554 A    6/2012

*Primary Examiner* — Frank B Vanaman
(74) *Attorney, Agent, or Firm* — Morgan, Lewis & Bockius LLP (57) ABSTRACT

A motor-driven steering column device for a vehicle, the motor-driven steering column device may include a housing fixed to a vehicle body and having a pipe through one side portion of which a slot is formed; a telescopic pipe inserted into an internal diameter portion of the housing to be movable back and forth and locked and fastened to a steering shaft; a telescopic bracket disposed on an internal diameter portion of the telescopic pipe; and a driving device coupling the telescopic pipe and the telescopic bracket through the slot and providing power of moving back and forth to the telescopic pipe and the telescopic bracket.

11 Claims, 7 Drawing Sheets

(56) References Cited

U.S. PATENT DOCUMENTS

| | | | |
|---|---|---|---|
| 2012/0024103 A1* | 2/2012 | Matsuno | B62D 1/181 |
| | | | 74/499 |
| 2015/0232117 A1* | 8/2015 | Stinebring | B62D 1/195 |
| | | | 74/493 |
| 2016/0068181 A1* | 3/2016 | Warashina | B62D 1/181 |
| | | | 74/493 |
| 2017/0015345 A1* | 1/2017 | Galehr | B62D 1/181 |
| 2018/0079445 A1* | 3/2018 | Kato | B62D 1/185 |

\* cited by examiner

[ BEFORE COLLISION ]

[ AFTER COLLISION ]

"LOAD IS SUPPORTED"

FIG. 10

MOTOR-DRIVEN STEERING COLUMN DEVICE FOR VEHICLE

CROSS-REFERENCE TO RELATED APPLICATION

The present application claims priority to Korean Patent Application No. 10-2017-0042828 filed on Apr. 3, 2017, the entire contents of which is incorporated herein for all purposes by this reference.

BACKGROUND OF THE INVENTION

Field of the Invention

The present invention relates to a motor-driven steering column device for a vehicle, and more particularly, to a motor-driven steering column device for a vehicle, which realizes weight reduction and simplification of structure by reducing the number of components while improving rigidity.

Description of Related Art

In general, a steering system for a vehicle includes a telescopic device for adjusting a distance between a driver and a steering wheel, and a tilting device for adjusting a vertical tilting angle of the steering wheel.

The telescopic device is one among various devices for convenience which allows the driver to adjust a distance between the driver and the steering wheel to a desired distance corresponding to the driver's body type by adjusting a front and rear length of a steering shaft connected to the steering wheel.

There are a manual telescopic device having a steering wheel and a steering shaft which are moved back and forth in an axial direction directly by a driver, and an electric telescopic device using motor power for improving the driver's convenience.

Here, an electric telescopic device included in a steering column device in the related art will be described with reference to the attached FIGS. 1 to 4.

Figure 1:
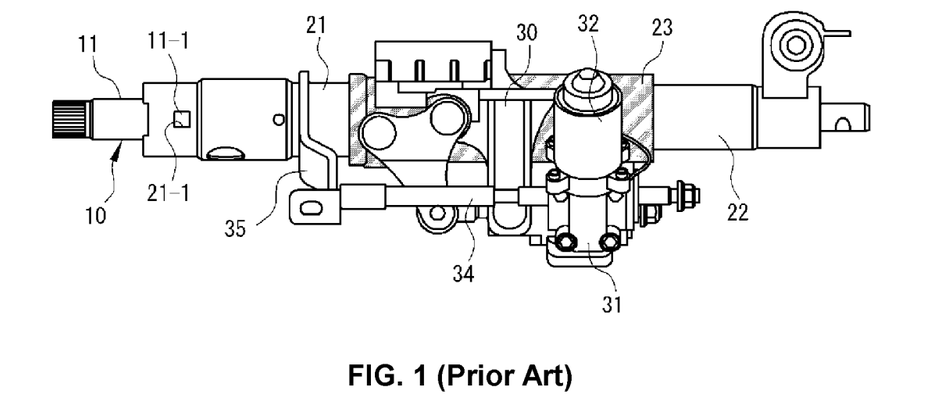
FIG. 1 is a side view illustrating an electric telescopic device in the related art.
Figure 2:
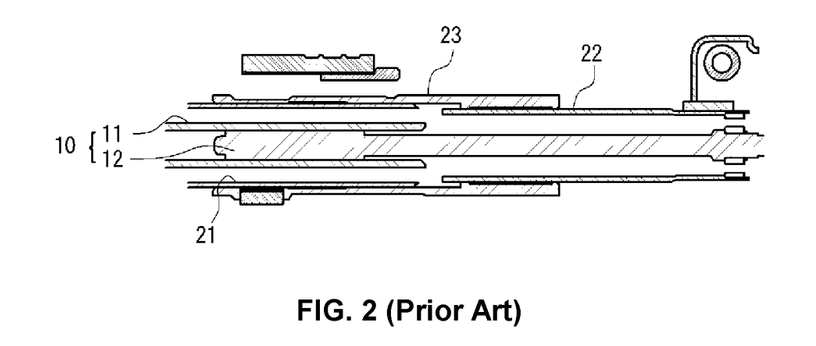
FIG. 2 is a cross-sectional view illustrating the electric telescopic device in the related art.
Figure 3:
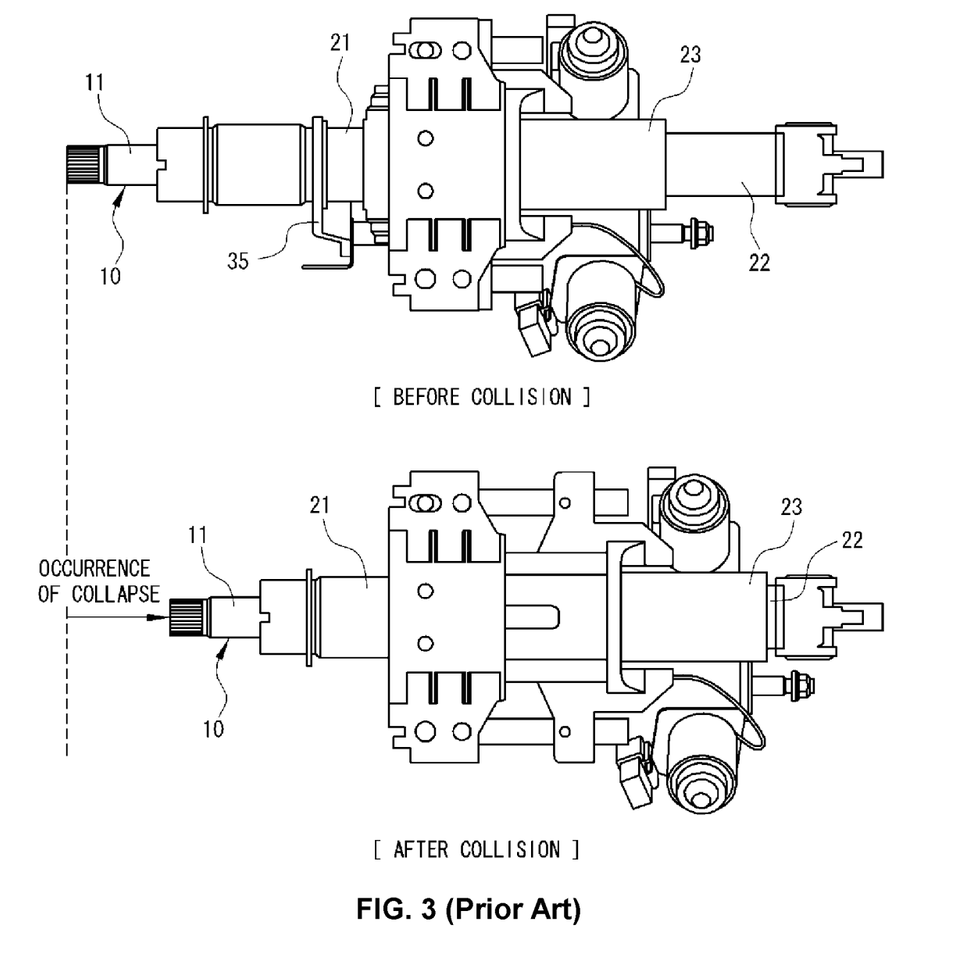
FIG. 3 is a top plan view illustrating an operating state of the electric telescopic device in the related art at the time of a collision.

In FIG. 1, FIG. 2, and FIG. 3, reference numeral 10 indicates a steering shaft.

The steering shaft 10 includes a first steering shaft 11 and a second steering shaft 12 which are spline-coupled to adjust a front and rear length.

That is, the first steering shaft 11 is spline-coupled to be movable back and forth with respect to the second steering shaft 12 which is in a fixed state.

A first pipe 21, a second pipe 22, and a housing 23 in a form of a pipe, that is, a total of three pipes are disposed to overlap one another around an external diameter portion of the steering shaft 10.

In more detail, the first pipe 21 is disposed around an external diameter portion of the first steering shaft 11 to be movable back and forth, the second pipe 22 is fixed to a vehicle body (e.g., cowl panel) and disposed around an external diameter portion of the second steering shaft 12, and the housing 23 is disposed to be movably in close contact with external diameter surfaces of the first pipe 21 and the second pipe 22.

In the instant case, a locking hole 21-1 is formed in the first pipe 21, and a locking protrusion 11-1, which is inserted and locked into the locking hole 21-1, is formed on the first steering shaft 11.

A bracket 30 is mounted on an external diameter surface of the housing 23, a motor 31 is fixedly mounted on the bracket 30, a gear box 32 is mounted at an output side of the motor 31, and a screw 34 is coupled to an internal thread, which is present in the gear box 32, to be movable back and forth.

A telescopic bracket 35 is connected between a front end portion of the screw 34 and an external diameter portion of the first pipe 21.

Therefore, when the internal thread in the gear box 32 is rotated in a forward or reverse direction by an operation of the motor 31, the screw 34 is moved straight in a forward or rearward direction, the first pipe 21, which is connected to the screw 34 by the telescopic bracket 35, is moved forward or rearward thereof, and simultaneously, the first steering shaft 11, which is locked and fastened to the first pipe 21, is moved forward or rearward thereof, such that a front and rear distance between the driver and the steering wheel connected to the first steering shaft 11 is automatically adjusted.

Meanwhile, in a case in which the driver's body collides with the steering wheel due to a vehicle accident, the first pipe 21, which is connected to the steering wheel, the housing 23, which is in close contact with the external diameter surface of the first pipe 21, the bracket 30, which is mounted on the external diameter portion of the housing 23, and the motor 31, are collapsed and moved forward together by a predetermined length toward a front side of the vehicle, as illustrated in FIG. 3, to absorb impact energy when the driver collides with the steering wheel, achieving a reduction in injuries to the driver.

However, the electric telescopic device in the related art has the following problems.

First, a large number of pipe components including the first pipe, the second pipe, and the housing in a form of a pipe are required to implement the electric telescopic function and absorb impact energy caused by the collapse, which causes an increase in weight and costs.

Second, overlap lengths among the pipes including the first pipe, the second pipe, and the housing in a form of a pipe are short, and as a result, there is a problem in that rigidity deteriorates.

Figure 4:
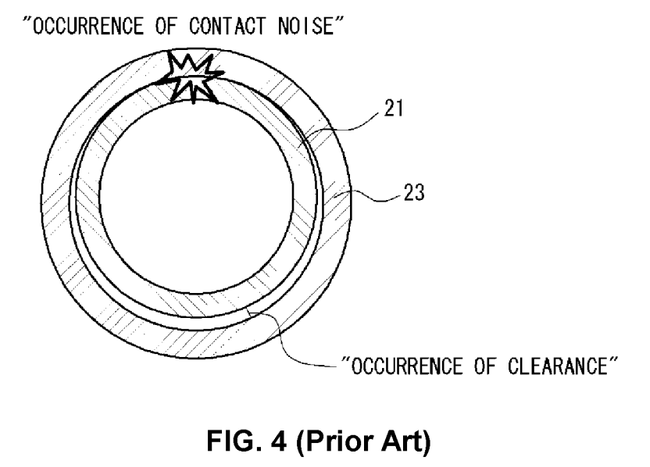
FIG. 4 is a cross-sectional view illustrating a state in which a clearance occurs between a first pipe and a housing of the electric telescopic device in the related art.
Figure 5:
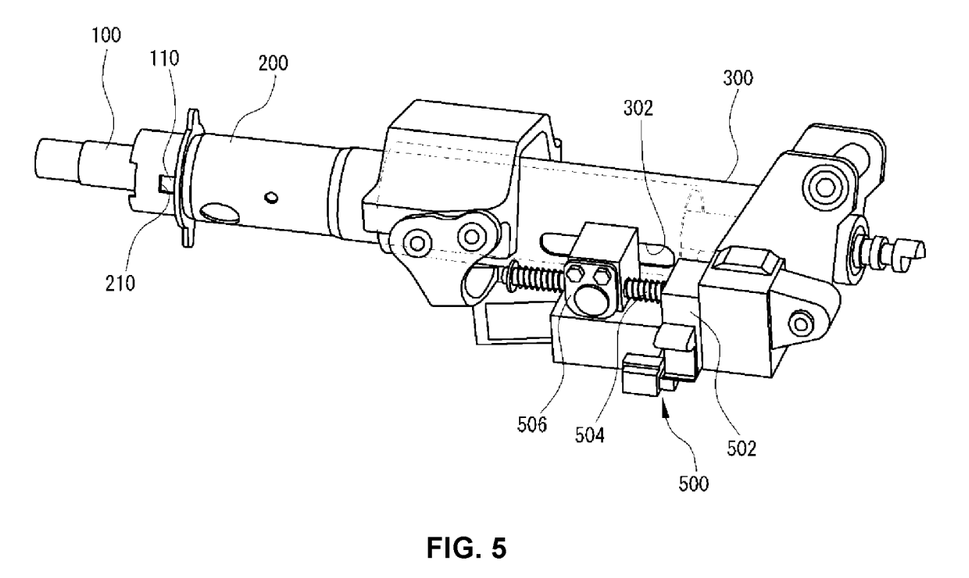
FIG. 5 is a perspective view illustrating a motor-driven steering column device for a vehicle according to an exemplary embodiment of the present invention.
Figure 6:
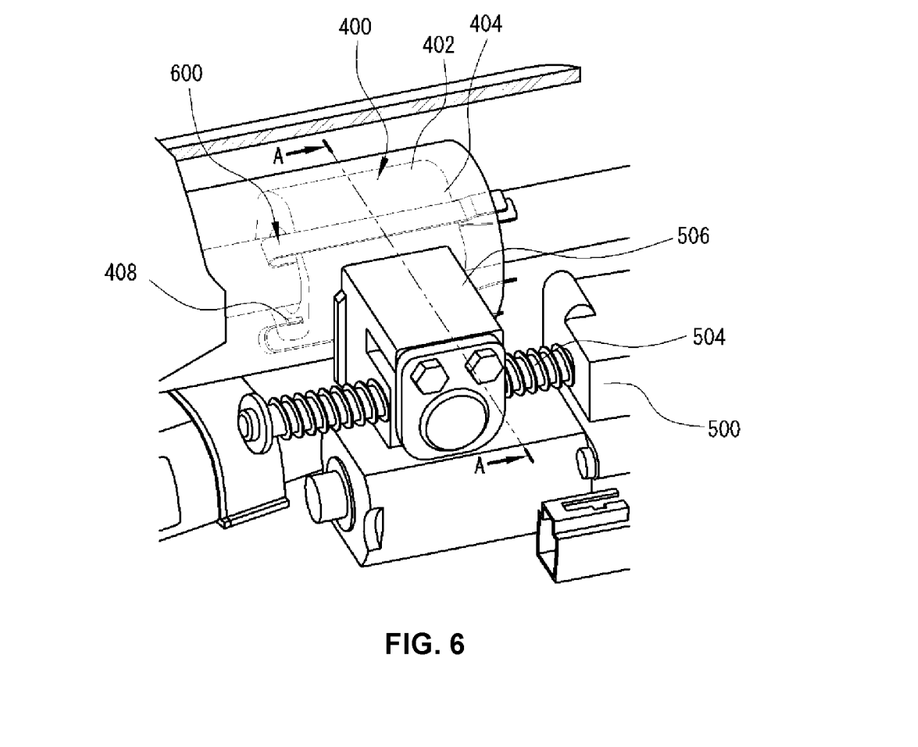
FIG. 6 is a main portion enlarged perspective view illustrating the motor-driven steering column device for a vehicle according to an exemplary embodiment of the present invention.

Third, as illustrated in FIG. 4, the external diameter surface of the first pipe 21 and an internal diameter surface of the housing 23 need to be slidably in contact with each other while forming a circle, but the external diameter surface of the first pipe 21 and the internal diameter surface of the housing 23 cannot form a circle due to a processing tolerance, and as a result, there is a problem in that a clearance occurs between the external diameter surface of the first pipe 21 and the internal diameter surface of the housing 23, and noise occurs due to the occurrence of the clearance.

And fourth, because of the occurrence of the clearance between the external diameter surface of the first pipe 21 and the internal diameter surface of the housing 23, there is a problem in that frictional noise occurs due to contact between the first pipe 21 and the housing 23 when the first pipe 21 performs a telescopic operation to be moved back and forth.

Various aspects of the invention are discussed infra.

BRIEF SUMMARY

Various aspects of the present invention are directed to providing a motor-driven steering column device for a vehicle, configured for easily implementing an electric telescopic function, realizing a weight reduction and costs by reducing the number of pipe components compared to the related art, and having improved rigidity by increasing an overlap length between a telescopic pipe and a housing, by configurations including the telescopic pipe connected to a steering wheel, the housing in a form of a pipe which is disposed to overlap an external diameter portion of the telescopic pipe, and a drive device which moves the telescopic pipe back and forth.

The present invention, in various aspects, has also been made in an effort to easily absorb impact energy when a driver collides with a steering wheel by connecting a bending plate between a telescopic pipe and a bracket to absorb collision energy at the time of a collision accident when the driver collides with the steering wheel and the telescopic pipe is collapsed.

The present invention, in various aspects, has also been made in an effort to prevent the occurrence of noise by eliminating a clearance between a telescopic pipe and a housing by improving a manner of contact between an external diameter surface of the telescopic pipe and an internal diameter surface of the housing with a manner in which the external diameter surface of the telescopic pipe and the internal diameter surface of the housing are supported by four or more support structures.

Various aspects of the present invention are directed to providing a motor-driven steering column device for a vehicle, the motor-driven steering column device including: a housing which is fixed to a vehicle body and has a pipe through one side portion of which a slot is formed; a telescopic pipe which is inserted into an internal diameter portion of the housing to be movable back and forth and locked and fastened to a steering shaft; a telescopic bracket which is disposed on an internal diameter portion of the telescopic pipe; and a driving device which couples the telescopic pipe and the telescopic bracket through the slot and provides power of moving back and forth to the telescopic pipe and the telescopic bracket.

In an exemplary embodiment, the telescopic bracket may has arched portion plates in close contact with an internal diameter surface of the telescopic pipe, and straight portion plates distanced from the internal diameter surface of the telescopic pipe, wherein the arched portion plates and the straight portion plates are integrally and repeatedly formed in a circumferential direction of the telescopic bracket, and an internal thread hole is formed in one end portion of the telescopic bracket.

In another exemplary embodiment, a guide hole through which a bending plate is inserted may be further formed in an internal surface of the straight portion plate of the telescopic bracket.

In still another exemplary embodiment, the slot may be long to limit back and forth movements of the telescopic pipe and the telescopic bracket and extend in a front and rear direction thereof.

In yet another exemplary embodiment, the driving device may include: a motor which is mounted on an external diameter portion of the housing; a screw which is connected to an output shaft of the motor; a back and forth moving block into which the screw is inserted and fastened to be rotatable on a spot; and a bolt which is fastened to the internal thread hole of the telescopic bracket from the back and forth moving block and couples the telescopic bracket and the telescopic pipe.

In still yet another exemplary embodiment, the bolt may have a telescopic bushing attached to a head portion thereof, the telescopic bushing being including a material contactable with an inlet surface of the slot of the housing to slip on the inlet surface of the slot.

In a further exemplary embodiment, the bolt may has a collision absorbing bushing inserted into a bottom portion thereof, wherein the collision absorbing bushing tightens and closely attaches the telescopic pipe to the telescopic bracket.

In another further exemplary embodiment, the motor-driven steering column device may further include: a bending plate including a straight plate of which one end portion is fixed to an internal diameter end portion of the telescopic pipe; and a restriction plate extending from the other end portion of the straight plate; passing through a guide hole of the telescopic bracket; extending toward a rear end portion of the telescopic bracket; and having a curved cross section.

In still another further exemplary embodiment, the straight plate of the bending plate may be disposed straight in a space of the telescopic bracket where a straight portion plate and the telescopic pipe are distanced from each other.

In yet another further exemplary embodiment, the restriction plate of the bending plate may have a curved cross section formed convexly outward, such that the restriction plate is disposed to be in friction contact with an internal surface of a straight portion plate of the telescopic bracket.

In still yet another further exemplary embodiment, three or four or more load support structures, which are in close contact with an external diameter surface of the telescopic pipe, may be integrally formed to protrude on an internal diameter surface of the housing in a circumferential direction at an equal interval.

In a still further exemplary embodiment, the load support structures may be concentratedly formed on the internal diameter surface at an inlet side of the housing, and are wide toward a rear end portion from a front end portion.

Through the aforementioned technical solutions, various aspects of the present invention are directed to providing the effects below.

First, it is possible to realize a weight reduction and costs by reducing the number of pipe components required to implement the telescopic function of the steering wheel in comparison with the related art, and it is possible to increase rigidity by increasing an overlap length between the telescopic pipe and the housing.

Second, it is possible to easily absorb impact energy when the driver collides with the steering wheel by connecting the bending plate, which may absorb collision energy when the telescopic pipe is collapsed, between the telescopic pipe and the bracket.

Third, it is possible to prevent the occurrence of noise by eliminating a clearance between the telescopic pipe and the housing by improving a manner of contact between the external diameter surface of the telescopic pipe and the internal diameter surface of the housing with a manner in which the external diameter surface of the telescopic pipe and the internal diameter surface of the housing are supported by the four or more support structures.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The attached FIGS. 5 to 8 are views illustrating a motor-driven steering column device for a vehicle according to an exemplary embodiment of the present invention, and in the drawings, reference numeral 300 indicates a housing.

The housing 300 has a hollow pipe shape, and a rear end portion of the housing 300 is mounted and fixed to a vehicle body (e.g., cowl panel).

A slot 302 is formed at one side portion of the housing 300 to extend in a front and rear direction, and a front and rear length of the slot 302 is set to a level for limiting back and forth movements of a telescopic pipe 200 and a telescopic bracket 400 as described below.

The telescopic pipe 200 is inserted into an internal diameter portion of the housing 300 to be movable back and forth, such that a rear end portion of the telescopic pipe 200 overlaps the internal diameter portion of the housing 300.

A steering shaft 100 connected to a steering wheel is locked and fastened by being inserted into an internal diameter portion of the telescopic pipe 200.

That is, a locking hole 210 is formed in a front end portion of the telescopic pipe 200, and a locking protrusion 110 is formed on the steering shaft 100, such that as the locking protrusion 110 is inserted and fastened into the locking hole 210, the steering shaft 100 is locked and fastened by being inserted into the internal diameter portion of the telescopic pipe 200.

Therefore, the steering shaft 100 and the telescopic pipe 200 are disposed to be movable along the internal diameter portion of the housing 300 in a state in which the steering shaft 100 and the telescopic pipe 200 are locked and fastened to each other.

According to an exemplary embodiment of the present invention, the telescopic bracket 400 is disposed in the internal diameter portion of the telescopic pipe 200, the telescopic pipe 200 and the telescopic bracket 400 are coupled to each other by a driving device 500 through the slot 302 of the housing 300, and the driving device 500 provides power for the back and forth movement to the telescopic pipe 200 and the telescopic bracket 400 coupled to each other.

Figure 7:
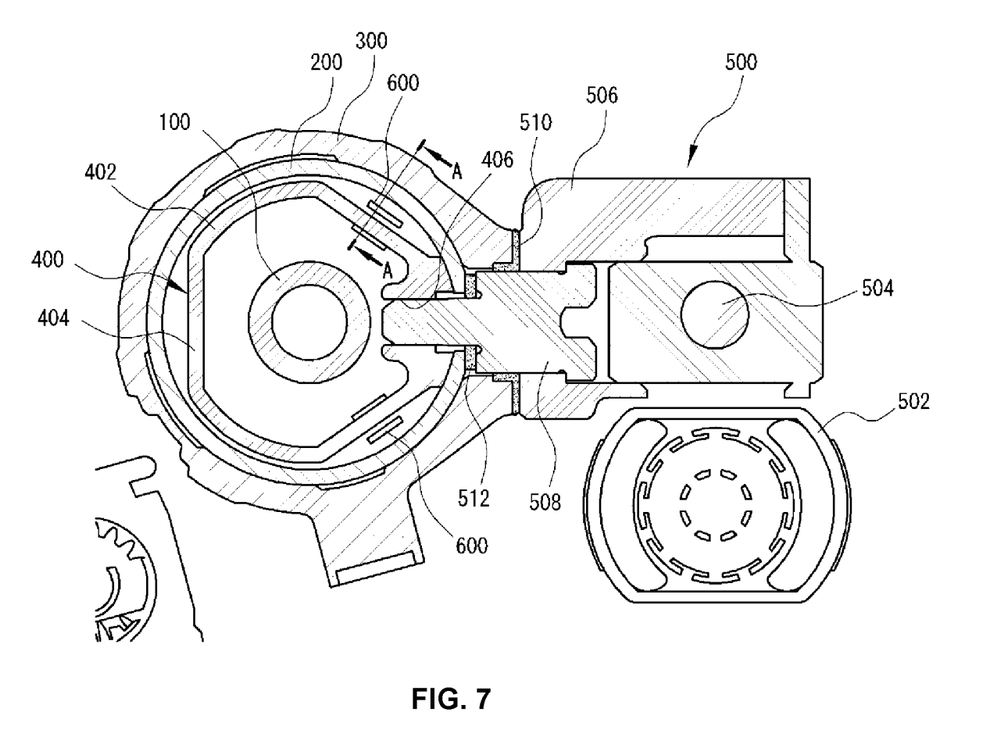
FIG. 7 is a cross-sectional view illustrating the motor-driven steering column device for a vehicle according to an exemplary embodiment of the present invention.

As well illustrated in FIG. 7, the telescopic bracket 400 has arched portion plates 402 in close contact with an internal diameter surface of the telescopic pipe 200 and have an arched cross section, and straight portion plates 404 distanced from the internal diameter surface of the telescopic pipe 200 and have a straight cross section, are integrally and repeatedly formed in a circumferential direction, and an internal thread hole 406 is formed in one end portion of the telescopic bracket 400.

Guide holes 408, through which bending plates 600 are inserted as described below, are formed through internal surfaces of the straight portion plates 404 of the telescopic bracket 400.

The driving device 500 includes a motor 502 which is mounted on an external diameter portion of the housing 300, a screw 504 which is connected to an output shaft of the motor 502 and disposed in a longitudinal direction of the housing 300, a back and forth moving block 506 which is thread-coupled to the screw 504 and moved forward or rearward when the screw 504 is rotated in place, and a bolt 508 which is inserted from the back and forth moving block 506 and fastened to the internal thread hole 406 of the telescopic bracket 400 to couple the telescopic bracket 400 and the telescopic pipe 200.

In the instant case, a telescopic bushing 510 is attached to a head portion of the bolt 508, wherein the telescopic bushing includes a material configured for contacting with an inlet surface of the slot 302 of the housing 300 to slip on the inlet surface of the slot 302 while having an "L"-shaped cross section, such that when the back and forth moving block 506 is moved back and forth, the back and forth moving block 506 is not in direct contact with the housing 300, and the telescopic bushing 510 is in slide contact with the inlet surface of the slot 302 of the housing 300.

Therefore, since the telescopic bushing 510 is in slide contact with the inlet surface of the slot 302 of the housing 300 when the back and forth moving block 506 is moved back and forth, direct frictional resistance force between the back and forth moving block 506 and the housing 300 may be eliminated, and the back and forth moving block 506 may be smoothly moved back and forth.

A collision absorbing bushing 512 is inserted into a bottom portion of the head portion of the bolt 508, and the collision absorbing bushing 512 is configured to tighten and closely attach the telescopic pipe 200 to the telescopic bracket 400 when the bolt 508 is fastened to the internal thread hole 406 of the telescopic bracket 400 from the back and forth moving block 506, and is configured to guide a collapse movement of the telescopic pipe 200 at the time of a collision accident as described below.

Here, an electric telescopic operation flow of the steering wheel which is configured as described above will be described below.

First, when the motor 502 of the driving device 500 is operated, the screw 504 connected to the output shaft of the motor 502 is rotated in place.

Next, the back and forth moving block 506 thread-coupled to the screw 504 is moved straight forward or rearward as the screw 504 is rotated in place, and a forward movement distance or a rearward movement distance of the back and forth moving block 506 is limited to a distance by which the bolt 508 is moved forward or rearward along the slot 302 formed in one side portion of the housing 300.

Next, the telescopic pipe 200 and the telescopic bracket 400, which are coupled to each other by the back and forth moving block 506 and the bolt 508, are moved forward or rearward thereof, and the steering shaft 100 locked and fastened to the telescopic pipe 200 is also moved forward or rearward together.

As a result, as the steering wheel connected to the steering shaft 100 is moved forward or rearward thereof, a distance between the driver's upper body and the steering wheel is adjusted to a distance desired by the driver.

As described above, in comparison with a structure in the related art in which a total of three pipes are disposed to overlap one another to implement a telescopic function of the steering shaft, the telescopic function may be implemented by only two pipes, that is, the telescopic pipe connected to the steering shaft, and the housing in a form of a pipe fixed to the vehicle body, and as a result, it is possible to realize a weight reduction and costs by reducing the number of pipe components compared to the related art, and it is possible to increase rigidity by increasing an overlap length between the telescopic pipe and the housing.

Figure 8:
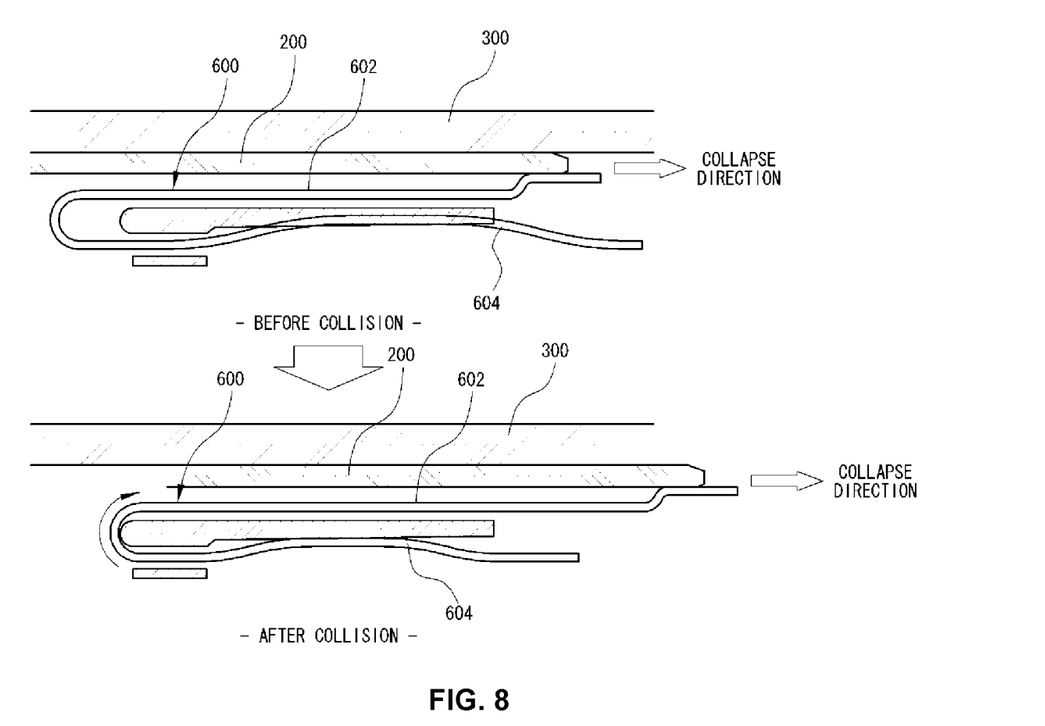
FIG. 8 is a cross-sectional view taken along line A-A in FIG. 7.

Meanwhile, the bending plate 600, which absorbs impact occurring when the driver's upper body collides with the steering wheel at the time of a vehicle collision accident, is mounted between the telescopic bracket 400 and the telescopic pipe 200.

In more detail, as illustrated in the attached FIG. 8, the bending plate 600 includes a straight plate 602 of which one end portion is fixed to an internal diameter end portion of the telescopic pipe 200 by welding, and a restriction plate 604 which is bent at 180° from the other end portion of the straight plate 602, passes through the guide hole 408 of the telescopic bracket 400, extends toward a rear end portion of the telescopic bracket 400, and has a curved cross section.

In the instant case, the straight plate 602 of the bending plate 600 is disposed straight in a space of the telescopic bracket 200 where the straight portion plate 404 and the telescopic pipe 200 are distanced from each other, and the restriction plate 604 of the bending plate 600 has a curved cross section formed convexly outward, such that the restriction plate 604 of the bending plate 600 is disposed to be in friction contact with an internal surface of the straight portion plate 404 of the telescopic bracket 200.

Therefore, when the driver's body collides with the steering wheel due to a vehicle accident, the telescopic pipe 200 connected to the steering shaft 100 is collapsed and moved forward by a predetermined length toward a front side of the vehicle, and as a result, it is possible to easily absorb collision energy.

That is, when the driver's body collides with the steering wheel due to a vehicle accident, the telescopic pipe 200 absorbs collision energy while causing friction with the collision absorbing bushing 512 at the moment when the telescopic pipe 200 is moved in a collapse direction, and simultaneously, the bending plate 600 absorbs collision energy while being dragged when the telescopic pipe 200 is moved in the collapse direction thereof.

When the bending plate 600 is dragged when the telescopic pipe 200 is moved in the collapse direction, the restriction plate 604 of the bending plate 600 comes into friction contact with the internal surface of the straight portion plate 404 of the telescopic bracket 200, such that it is possible to more easily absorb collision energy by the friction energy.

As described above, since the bending plate 600, which may absorb collision energy when the telescopic pipe 200 is collapsed, is connected between the telescopic pipe 200 and the bracket 400, it is possible to reduce injuries to the driver by absorbing impact energy when the driver collides with the steering wheel.

Meanwhile, as described above with reference to the attached FIG. 4, because of the occurrence of the clearance between the external diameter surface of the first pipe 21 and the internal diameter surface of the housing 23, there is a problem in that frictional noise occurs due to contact between the first pipe 21 and the housing 23 when the first pipe 21 performs a telescopic operation to be moved back and forth.

Figure 9:
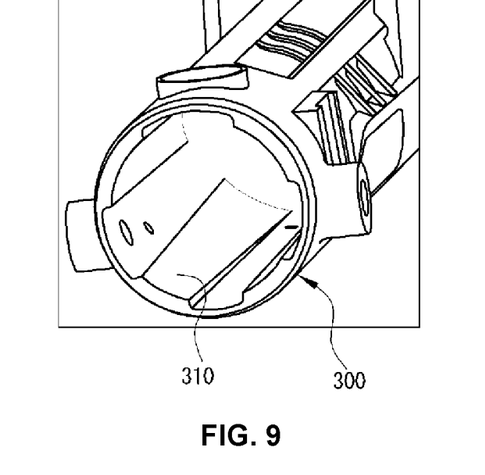
FIG. 9 is a perspective view illustrating an internal structure of a housing of the motor-driven steering column device for a vehicle according to an exemplary embodiment of the present invention.
Figure 10:
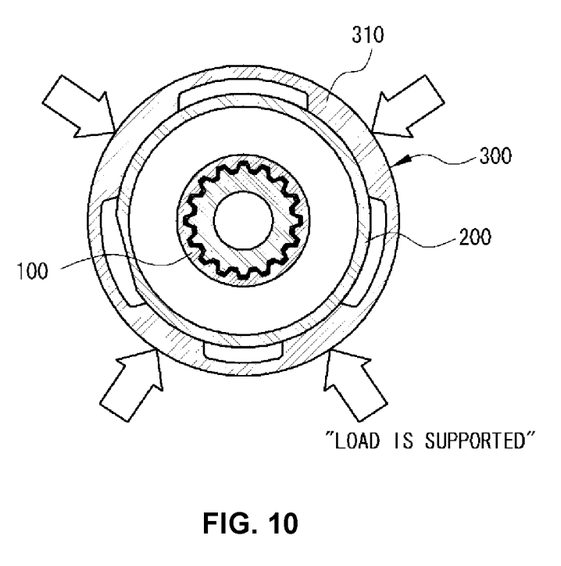
FIG. 10 is a cross-sectional view illustrating a contact structure between the housing and a telescopic pipe of the motor-driven steering column device for a vehicle according to an exemplary embodiment of the present invention.

To solve the problem, as illustrated in the attached FIG. 9 and FIG. 10, three or four or more load support structures 310, which are in close contact with an external diameter surface of the telescopic pipe 200, are integrally formed to protrude on an internal diameter surface of the housing 300 in a circumferential direction at an equal interval.

The load support structures 310 are concentratedly formed on the internal diameter surface at an inlet side of the housing 300, and a width of the load support structure 310 is gradually increased from a front end portion toward a rear end portion to increase a support area with respect to the telescopic pipe 200.

Therefore, the external diameter surface of the telescopic pipe 200 and the internal diameter surface of the housing 300 are securely supported by the three or four or more load support structures 310, and as a result, it is possible to prevent the occurrence of noise by eliminating a clearance between the telescopic pipe 200 and the housing 300.

Since the external diameter surface of the telescopic pipe 200 and the internal diameter surface of the housing 300 are securely supported by the three or four or more load support structures 310, it is possible to implement rigidity reinforcement for easily withstanding a bending load even though the bending load caused by external force is applied to the telescopic pipe 200 in a state in which an overlap length between the telescopic pipe 200 and the housing 300 is increased.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the locations of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A motor-driven steering column device for a vehicle, the motor-driven steering column device comprising:
    a housing fixed to a vehicle body and having a pipe through one side portion of which a slot is formed;
    a telescopic pipe inserted into an internal diameter portion of the housing to be movable back and firth and locked and fastened to a steering shaft;
    a telescopic bracket disposed on an internal diameter portion of the telescopic pipe; and
    a driving device coupling the telescopic pipe and the telescopic bracket through the slot and providing power of moving back and forth to the telescopic pipe and the telescopic bracket,
    wherein the telescopic bracket includes:
        arched portion plates in contact with an internal diameter surface of the telescopic pipe;
        straight portion plates distanced from the internal diameter surface of the telescopic pipe, which are integrally and repeatedly formed together in a circumferential direction thereof; and
        an internal thread hole formed on one end portion of the telescopic bracket.

2. The motor-driven steering column device of claim 1, wherein the straight portion plates of the telescopic bracket have a guide hole inside, through which a bending plate is inserted.

3. The motor-driven steering column device of claim 1, wherein the slot is long to limit movements of the telescopic pipe and the telescopic bracket and extends in a front and rear direction thereof.

4. The motor-driven steering column device of claim 1, wherein the driving device includes:
    a motor mounted on an external diameter portion of the housing;
    a screw connected to an output shall of the motor;
    a back and forth moving block into which the screw is inserted and fastened to be rotatable; and
    a bolt fastened to an internal thread hole of the telescopic bracket from the back and forth moving block and coupling the telescopic bracket and the telescopic pipe with each other.

5. The motor-driven steering column device of claim 4, wherein the bolt has a telescopic bushing attached to a head portion thereof, the bushing being a material contactable with an outer circumferential surface of the slot of the housing to slip on the outer circumferential surface of the slot.

6. The motor-driven steering column device of claim 4, wherein the bolt has a collision absorbing bushing attached to a bottom portion thereof, the collision absorbing bushing tightening and attaching the telescopic pipe to the telescopic bracket.

7. The motor-driven steering column device of claim 1, further including:
    a bending plate including a straight plate of which a first end portion is fixed to an internal diameter end portion of the telescopic pipe, and a restriction plate having a curved cross section which extends from a second end portion of the straight plate, passes through a guide hole of the telescopic bracket, extends toward a rear end portion of the telescopic bracket.

8. The motor-driven steering column device of claim 7, wherein the straight plate of the bending plate is disposed straight in a space of the telescopic bracket where the straight portion plates and the telescopic pipe are distanced from each other.

9. The motor-driven steering column device of claim 7, wherein the restriction plate of the bending plate has a curved cross section formed convexly outward, and wherein the restriction plate is disposed to be in friction contact with an internal surface of the straight portion plates of the telescopic bracket.

10. The motor-driven steering column device of claim 1, wherein the external diameter surface of the telescopic pipe has at least three load support structures protruded at an equal interval in a circumferential direction thereof.

11. The motor-driven steering column device of claim 10, wherein the load support structures are concentratedly formed on the internal diameter surface of the housing, and are wide toward a rear end portion from a front end portion thereof.

* * * * *